United States Patent [19]

Takada

[11] Patent Number: 4,967,281

[45] Date of Patent: Oct. 30, 1990

[54] CAMERA WITH EXCHANGEABLE LENS DEVICE REMOVABLY MOUNTED ON A CAMERA BODY

[75] Inventor: Shinji Takada, Kanagawa, Japan

[73] Assignee: Sony Corporation, Tokyo, Japan

[21] Appl. No.: 301,597

[22] Filed: Jan. 26, 1989

[30] Foreign Application Priority Data

Feb. 26, 1988 [JP] Japan ................................ 63-42274

[51] Int. Cl.$^5$ ............................................. H04M 3/14
[52] U.S. Cl. .................................... 358/229; 358/225
[58] Field of Search ....................... 358/209, 229, 225; 354/286

[56] References Cited

U.S. PATENT DOCUMENTS

| | | | |
|---|---|---|---|
| 4,471,383 | 9/1984 | Shiono et al. | 358/228 |
| 4,518,239 | 5/1985 | Tomori | 354/286 |
| 4,609,944 | 9/1986 | Nakada et al. | 358/228 |
| 4,728,980 | 3/1988 | Nakamura et al. | 354/286 |
| 4,831,450 | 5/1989 | Sato et al. | 358/209 |
| 4,833,498 | 5/1989 | Kato et al. | 358/225 |
| 4,837,594 | 6/1989 | Nakamura et al. | 354/286 |
| 4,851,897 | 7/1989 | Inuma et al. | 358/225 |

Primary Examiner—Stephen Brinich
Attorney, Agent, or Firm—Alvin Sinderbrand

[57] ABSTRACT

A camera has a main camera body containing a main microprocessor, and exchangeable lens devices interchangeably mountable on the camera body and each containing an auxiliary microprocessor storing information identifying the respective exchangeable lens device and characteristics of the latter. Each exchangeable lens device includes an imaging lens assembly having elements controllable by drive motors for adjusting respective functions, and the auxiliary microprocessor controls such drive motors in response to position control signals from the main microprocessor and provides to the latter the stored identifying information and sensed position signals corresponding to the positions of the controllable elements of the respective imaging lens assembly. The main microprocessor provides the position control signals on the basis of at least the sensed position signals and condition sensing signals which correspond to the focused or other condition of an image projected by the imaging lens means onto an imaging element within the camera body.

18 Claims, 6 Drawing Sheets

CAMERA WITH EXCHANGEABLE LENS DEVICE REMOVABLY MOUNTED ON A CAMERA BODY

BACKGROUND OF THE INVENTION

1. Field of the Invention

This invention relates generally to cameras, and more particularly is directed to cameras of the type having a camera body on which exchangeable lens devices are interchangeably mountable.

2. Description of the Prior Art

It has been proposed to provide a video or other camera comprised of a main portion or camera body on which exchangeable lens devices are interchangeably mounted so that, at any time, the lens device in use will be best suited for the encountered conditions.

It has further been proposed, in such cameras, to detect optical information within the camera body, such as, the focused condition of, or the amount of light in an image projected by the exchangeable lens device onto an imaging element within the camera body, and to control functions of an imaging lens assembly included in the exchangeable lens device on the basis of such optical information, for example, so as to effect so-called auto focusing and/or automatic exposure control. In order to achieve such automatic control of functions of the imaging lens assembly, sensors are provided within the camera body for sensing the optical information, whereupon a drive voltage based on the sensed optical information is supplied to the exchangeable lens device for operating a drive motor or the like by which a function of the imaging lens assembly, such as, the focusing or exposure, is automatically adjusted, for example, as in U.S. Pat. No. 4,609,944 and U.S. Pat. No. 4,471,383, respectively, which each have a common assignee herewith.

In the previously proposed camera in which a drive voltage is supplied from the camera body to the exchangeable lens device for operating a drive motor in the latter by which a respective function of the imaging lens assembly is adjustably controlled, it is necessary to provide a current conducting path, including respective electrical contacts at an interface between the camera body and the exchangeable lens device, for each of the several adjustable functions of the imaging lens assembly, for example, for the auto focusing and automatic exposure control functions. Therefore, as the number of automatic functions is increased, the number of current conducting paths or channels between the camera body and the exchangeable lens device has to be correspondingly increased leading to increased size and cost of the camera. Further, the characteristics of the drive motors included in the several exchangeable lens devices intended to be used interchangeably with one camera body may be substantially unequal by reason of differences in the focal lengths or weights of the imaging lens assemblies included in the exchangeable lens devices, respectively. This makes it difficult to effect the optimum control of the imaging lens assemblies of the interchangeably used lens devices by means of the drive voltages produced in the camera body without reference to the characteristics of the exchangeable lens device then mounted thereon.

OBJECTS AND SUMMARY OF THE INVENTION

Accordingly, it is an object of this invention to provide a camera having a camera body and exchangeable lens devices interchangeably mountable on the camera body, and which is capable of adjusting one or more functions of the exchangeable lens device in use with the camera body while avoiding the above mentioned disadvantages of the prior art.

More specifically, it is an object of this invention to provide a camera comprised of a camera body and exchangeable lens devices interchangeably mountable on the camera body and having adjustable functions which are automatically controllable in a reliable and accurate manner, notwithstanding the fact that the exchangeable lens devices have substantially different characteristics, such as, different focal lengths and weights, and correspondingly different drive motor characteristics.

In accordance with an aspect of this invention, each of the exchangeable lens devices includes an imaging lens assembly having elements which are controllable for adjusting respective functions thereof, for example, focusing or exposure control, a drive motor associated with each of the adjustable functions of the imaging lens assembly and being operative to drive the respective controllable elements, sensors for sensing positions of the controllable elements as established by the respective drive motors and providing corresponding position information, and signal processing means, such as, a microprocessor or CPU, in the exchangeable lens device for controlling the drive motors in accordance with externally applied position control signals and for providing sensed position signals to the outside of the exchangeable lens device in response to the position information from the sensors.

The camera body on which the exchangeable lens devices are interchangeably mounted also contains a signal processing means, such as, a main microprocessor or CPU, which receives the sensed position signals from the exchangeable lens device then in use and provides the position control signals on the basis of such sensed position signals and at least condition sensing signals that are characteristic of respective conditions, such as, the degree of focusing of, or the amount of light, in an image projected on an imaging element of the camera body by means of the imaging lens assembly of the exchangeable lens device. By reason of the foregoing arrangement, when the various exchangeable lens devices are interchangeably mounted on the camera body, the microprocessor within the exchangeable lens device which is in use is capable of performing optimum control of the respective imaging lens assembly through the respective drive motors in response to the position control signals from the microprocessor of the camera body even though the characteristics of the drive motors may differ from one exchangeable lens device to the other.

It is another feature of this invention to provide for the optical transmission of the position control signals the exchangeable lens devices interchangeably mounted thereon.

Further, when the invention is applied to a video camera, signal processing in the microprocessors of the camera body and the exchangeable lens devices, respectively, is facilitated by effecting the transmission of the position control and sensed position signals between the microprocessors of the camera body and the exchangeable lens device mounted thereon in synchronism with the vertical synchronizing signals, and by operating the drive motors to drive the respective controllable elements of the exchangeable lens device only during intervals between the successive intermittent transmissions of the position control and sensed position signals.

The above, and other objects, features and advantages of the invention, will be apparent in the following detailed description of preferred embodiments thereof which is to be read in connection with the accompanying drawings, wherein corresponding parts are identified by the same reference numerals in the several views.

DESCRIPTION OF THE PREFERRED EMBODIMENTS

Figure 1:
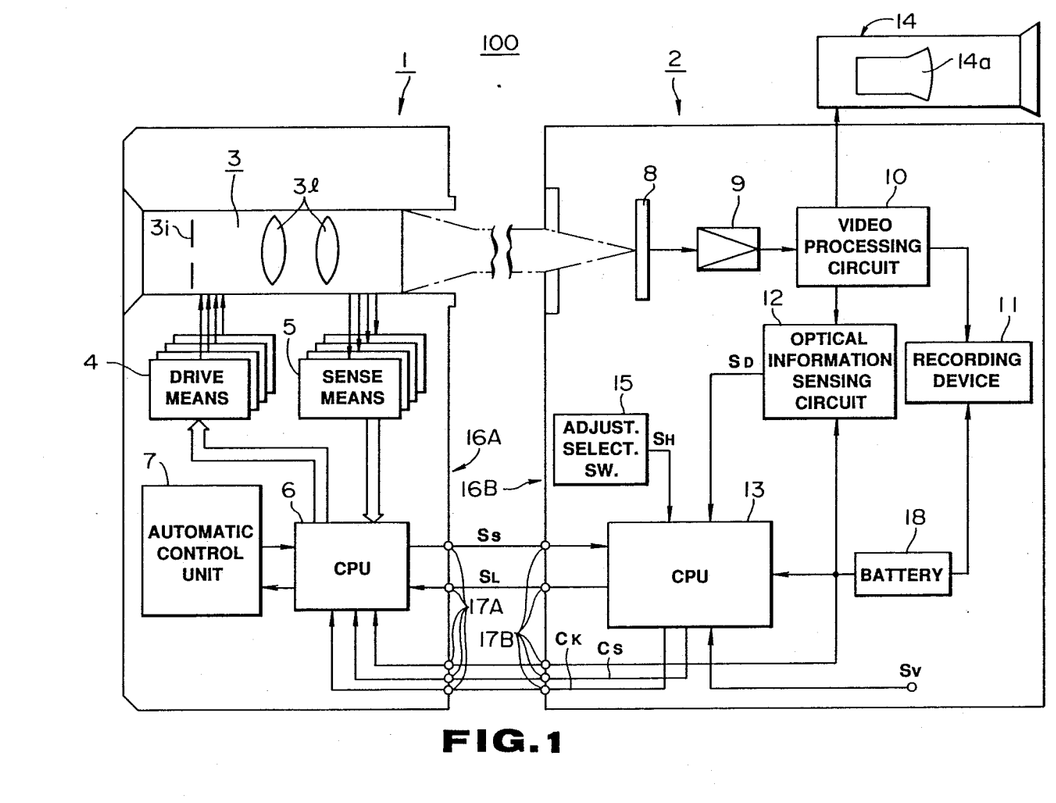
FIG. 1 is a block diagram showing a video camera according to an embodiment of the present invention.

Referring to the drawings in detail, and initially to FIG. 1 thereof, it will be seen that a video camera 100 in accordance with an embodiment of this invention includes an exchangeable lens device 1 and a camera body 2 to which the exchangeable lens device 1 is removably attached so as to be interchangeable with other similar exchangeable lens devices (not shown). The exchangeable lens device 1 includes an imaging lens assembly 3 having a plurality of imaging lenses 3l at least some of which are movable relative to the others in the axial direction, that is, in the direction of the optical axis of the assembly 3 for adjusting functions of the imaging lens assembly 3. More specifically such relative movements of the imaging lenses 3l in the direction of the optical axis have the function of adjusting the focal position or achieving focus adjustment, and/or adjusting the focal length, that is, achieving the so-called zooming adjustment. The imaging lens assembly 3 is further shown schematically to be provided with a diaphragm mechanism 3i having movable iris fins for adjusting the amount of light permitted to pass through the imaging lenses 3l, that is, for effecting exposure adjustment or iris control.

As is well known, the movable lenses 3l are adapted to be axially displaced relative to each other for effecting focus adjustment and/or zooming adjustment by a conventional mechanism (not shown) responsive to manual rotation of an associated adjustment ring and, similarly, the movable iris fins of the diaphragm mechanism 3i are adapted to be displaced by a suitable mechanism (not shown) in response to manual rotation of an adjustment ring for effecting exposure adjustment or control. The movable lenses 3l and the movable elements of the diaphragm mechanism 3i are also adapted to be driven and controlled by drive means 4, for example, by respective electric motors for controlling the respective adjustment functions. In other words, individual motors are provided in the drive means 4 for effecting the focusing adjustment, the zooming adjustment and the exposure adjustment, respectively.

Each exchangeable lens device 1 further includes sensors 5 which sense the positions of the elements controlled or driven by the several motors, respectively, of the drive means 4. In other words, sensors 5 are provided for sensing the positions of the movable lenses 3l and the movable iris fins of the diaphragm 3i by which the drive motors effect respective focus, zoom and exposure adjustments. The motors of the drive means 4 are controlled by a microprocessor or CPU 6 included in the respective exchangeable lens device 1 and receiving position information from the sensors 5. Further, the CPU 6 has stored therein information identifying the respective exchangeable lens device and the characteristics thereof, for example, information concerning the focal length or aperture of the imaging lens assembly 3 and/or information concerning the motors of the drive means 4.

An automatic control unit 7, for example, of the type employing a focal point sensor, may also be provided in the exchangeable lens device 1 and is connected with the respective CPU 6 for automatically effecting adjustment of the respective function, for example, for effecting auto focusing through suitable operations of the motors of drive means 4.

The main portion or body 2 of the camera 100 is shown to include an imaging element 8, for example, in the form of a CCD, which is situated at the focal point of the imaging lens assembly 3 of the exchangeable lens device 1 mounted on the body 2. The imaging element 8 is operative to convert an image projected thereon by the imaging lens assembly 3 into corresponding video signals. The video signals from the imaging element 8 are supplied through an amplifier 9 and a video processing circuit 10 to a video recording device 11, such as, a VTR. The video signals are also supplied from the video processing circuit 10 to an optical information sensing circuit 12 which, on the basis of the received video signal, senses the optical condition of the corresponding projected image, for example, the degree of focusing of such image and/or the amount of light therein. The circuit 12 provides condition sensing signals $S_D$ which are characteristic of the mentioned conditions of the image projected on the imaging element 8, and which are supplied to a microprocessor or CPU 13 included in the camera body 2. For sensing or detecting the degree of focusing of the image projected on the imaging element 8, the circuit 12 may sense or detect the level of the high frequency component of the video signal provided by the element 8 as a measure of the focused state. In other words, the level of the high frequency component of the video signal is maximized at the fully focused state of the image projected on the imaging element 8. On the other hand, the amount of light included in the image projected on the imaging element 8 may be sensed by the circuit 12 by detecting the level of the video signal, as a whole. The video signal obtained from the video processing circuit 10 is further supplied to an electric view finder 14 which includes a CRT 14a at which the image or picture projected on the imaging element 8 can be monitored.

The camera body 2 is further provided with adjustment selector switches 15 which are manually actuable by respective push-buttons 15A (FIG. 2B) for providing selected function adjustment signals $S_H$ to the CPU 13 of the camera body. Such selected function adjustment signals or commands are provided, at the operators will and irrespective of the state of the video signals, and hence of the condition sensing signals $S_D$, for obtaining desired adjustments of the functions of the imaging lens assembly 3, for example, for effecting a zooming adjustment.

The CPU 13 of the camera body 3 further receives sensed position signals $S_S$ which are provided by the CPU 6 of the exchangeable lens device 1 in response to the position information provided to the CPU 6 by the respective position sensors 5. On the basis of the condition sensing signals $S_D$, the selected function adjustment signals $S_H$ and the sensed position signals $S_S$ supplied to the CPU 13 of the camera body, the CPU 13 produces corresponding position control signals $S_L$ which are supplied to the CPU 6 of the exchangeable lens device 1 for causing the CPU 6 to suitable control the motors of the drive means 4 for obtaining desired adjustments of the functions of the imaging lens assembly 3. The sensed position signals $S_S$ provided from the CPU 6 to the CPU 13 further contain the information stored in the CPU 6 for identifying the respective exchangeable lens device 1 and the characteristics thereof.

Figure 2A:
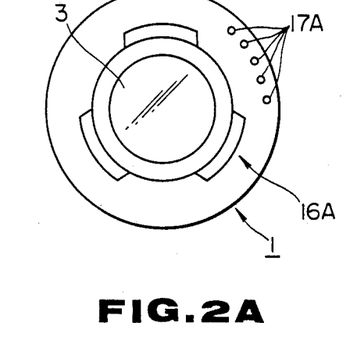
FIG. 2A is an elevational view of a mounting surface of an exchangeable lens device included in the video camera of FIG. 1.
Figure 2B:
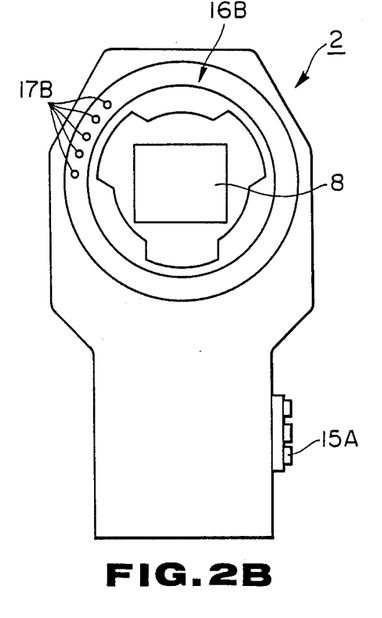
FIG. 2B is an elevational view of a mounting surface of a camera body included in the video camera of FIG. 1, and at which the exchangeable lens device of FIG. 2A interfaces with the camera body.

As shown on FIGS. 1, 2A and 2B, each exchangeable lens device 1 and the camera body 2 have mating surfaces 16A and 16B which come together or interface when the exchangeable lens device 1 is mounted on the camera body 2. Such mating surfaces 16A and 16B are provided with mutually engageable electrical contacts 17A and 17B, respectively, for each of the signals to be transmitted between the lens device 1 and the camera body 2. It will be apparent that the contacts 17A and 17B are intended to electrically engage each other for completing the signal transmission circuits between the CPUs 6 and 13 when an exchangeable lens device 1 is mounted on the camera body 2.

Vertical synchronizing signals $S_V$ which may, for example, be formed from the video signals in video processing circuit 10 are supplied to the CPU 13 of the camera body which, in turn, provides a chip select signal $C_S$ synchronized with the vertical synchronizing signal $S_V$. The CPU 13 also provides clock signals $C_K$ which, as hereinafter described in detail, are transmitted, in synchronism with the chip select signal $C_S$, from the CPU 13 to the CPU 6 through respective engaged contacts 17A and 17B for a purpose hereinafter described in detail. An electrical source, for example, in the form of a battery 18, is provided in the camera body 2 for supplying suitable electrical power to the CPU 13 and other operating components of the camera body 2 and also for supplying electric power, through respective engaged contact 17A and 17B at the mating surfaces 16A and 16B, to the CPU 6 of the exchangeable lens device 1 mounted on the camera body.

Figure 3A:
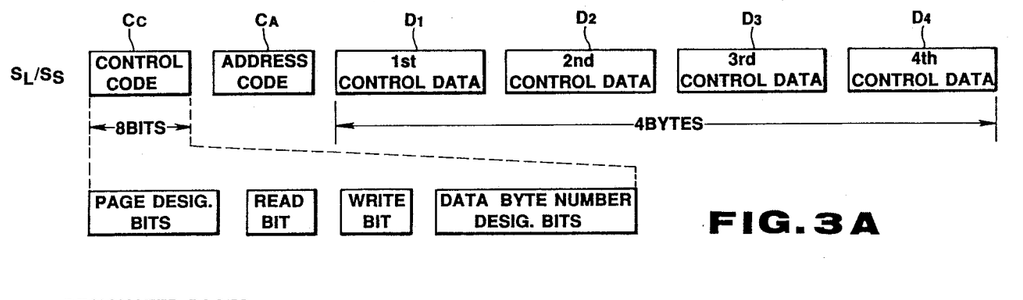
FIGS. 3A-3D are diagrammatic views illustrating the format of signals transmitted in the video camera of FIG. 1.

Referring now to FIG. 3A, it will be seen that the position control signals $S_L$ transmitted from the CPU 13 of the camera body to the CPU 6 of an exchangeable lens device 1 mounted thereon are comprised of a control code $C_C$, an address code $C_A$ and first to fourth control data $D_1$, $D_2$, $D_3$ and $D_4$ which total 4 bytes. The sensed position signals $S_S$ transmitted from the CPU 6 to the CPU 13 have a format similar to that of the signals $S_L$ with the specific differences hereinafter mentioned. The control code $C_C$ is formed of eight bits including two page designating bits, one read bit, one write bit, and three data byte number designating bits. Each page designated by the control code $C_C$ is divided into 4 pages P0, P1, P2 and P3, as shown on FIG. 3B. Each of these pages P0, P1, P2 and P3 is provided with respective read data and write data regions. Further, each of the pages P0–P3 is correlatively associated. For example, the page P0 may be reserved for information characterizing the exchangeable lens device 1, such as, the focal length, aperture ratio, zooming number and/or maker ID number, while the page P1 may be reserved for the position control signal $S_L$ or the sensed position signal $S_S$, as the case may be. Further, the page P2 may be reserved for the maker's or manufacturer's special data, such as, the lot number, date manufactured and the like, while the page P3 may be reserved for additional data that may be used in the future. The read bit of the control code $C_C$ indicates transmission of a sensed position signal $S_S$ from the exchangeable lens device 1 to the camera body 2, while the write bit of the control code $C_C$ indicates the transmission of a position control signal $S_L$ from the camera body 2 to the exchangeable lens device 1. The read and write bits respectively designate the read and write data regions of the designated pages. Finally, the data byte number designating bits at the end of the control code $C_C$ indicate the number of bytes of the data that is transmitted.

Figure 3B:
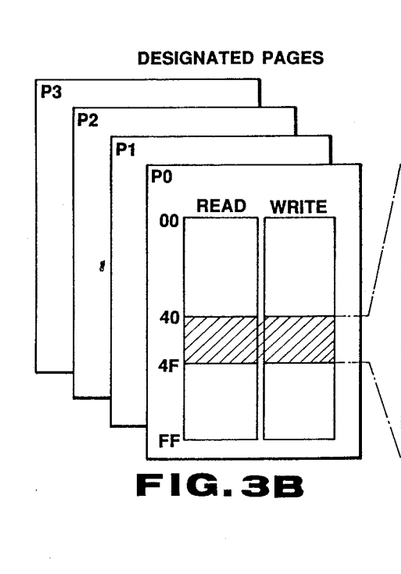

The address code $C_A$ of a sensed position signal $S_S$ or position control signal $S_L$ contains data identifying addresses of 00H to FFH according to the hexadecimal system as indicated by H, for each of the read and write data regions indicated on FIG. 3B. More particularly, the address code $C_A$ indicates, by its addresses, the data to be transmitted in the read data region in the case of a sensed position signal $S_S$, or the data to be transmitted in the write data region in the case of a position control signal $S_L$. For example, the address code $C_A$ may indicate the transmission of data at the addresses 40H to 4FH, as indicated on FIGS. 3B and 3C.

By way of example, if it is assumed that the drive means 4 in the exchangeable lens device 1 is provided with four drive motors $M_1$, $M_2$, $M_3$ and $M_4$, respectively, associated with respective adjustment functions of the imaging lens assembly 3 and that four of the position sensors 5 are provided for sensing the positions of the elements driven by the motors M1–M4 for adjusting the respective functions, 4 bytes of control data $D_1$, $D_2$, $D_3$ and $D_4$ at the addresses 40H–43H constitute the position control signal $S_L$ for the first motor $M_1$ or the sensed position signal $S_S$ associated with the motor $M_1$. Similarly, 4 bytes of data $D_1$–$D_4$ at the addresses 44H–47H of the write data region constitute a position control signal $S_L$ for the motor $M_2$, whereas, 4 bytes of data at the addresses 44H–47H in the read data region constitute a sensed position signal $S_S$ for the same motor $M_2$. Correspondingly, 4 bytes of data at the addresses 48H–4BH of the write and read data regions, and 4 bytes of data at the addresses 4CH–4FH of the write and read data regions provide position control signals $S_L$ and sensed position signals $S_S$ for the motors $M_3$ and $M_4$, respectively.

Figure 3C:
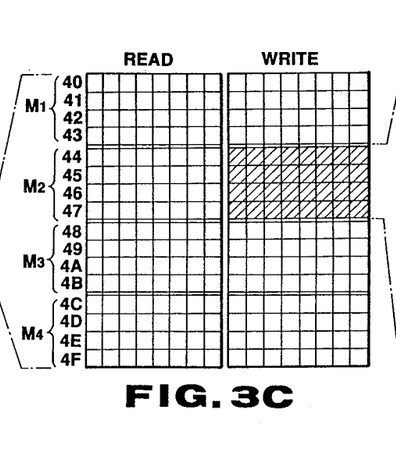
Figure 3D:
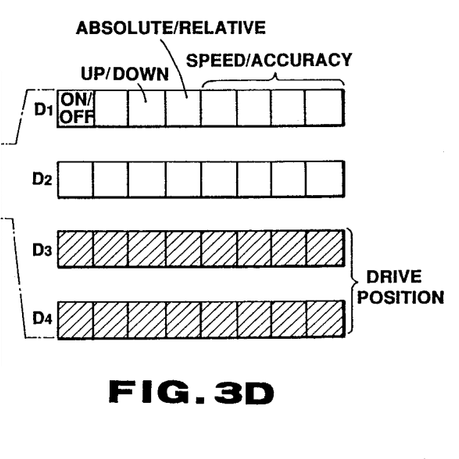

In the write mode, that is, in the case of a position control signal $S_L$, one bit of the data $D_1$ indicates whether the respective one of the motors of the drive means 4, for example, the motor $M_2$ in FIGS. 3C and 3D, should be operated or turned ON, one bit indicates the direction in which the drive motor $M_2$ is to be operated, that is, UP or DOWN, one bit indicates whether the position to which the drive is to be displaced by the motor $M_2$ in response to the transmitted position control signal $S_L$ is indicated in absolute or relative terms, and four bits indicate the speed with which the respective motor $M_2$ is to be operated. The 16 bits of the third and fourth bytes of control data $D_3$ and $D_4$ indicate the position to which the motor $M_2$ is to displace the respective element of the assembly 3 for achieving the desired adjustment of the function of the imaging lens assembly 3 in response to the transmitted position control signal $S_L$. The byte of data $D_2$ represents a reserve or spare data region.

In the read mode, that is, in the case of a sensed position signal $S_S$, the last four bits of the data $D_1$ (which indicate the drive speed in the case of a position control signal $S_L$) are employed to represent the bit number, and hence the adjustment accuracy, of the data $D_3$ and $D_4$, and hence the accuracy with which the respective function of the imaging lens assembly 3 in the exchangeable lens device 1 can be adjusted.

Figure 4A:
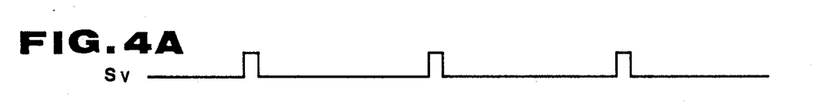
FIGS. 4A-4D are timing charts to which reference will be made in explaining the timed relationship of the transmission of signals between the camera body and the exchangeable lens device of FIG. 1 in respect to the generation of vertical synchronizing signals in the camera.
Figure 4B:
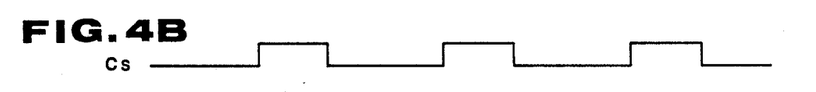
Figure 4C:
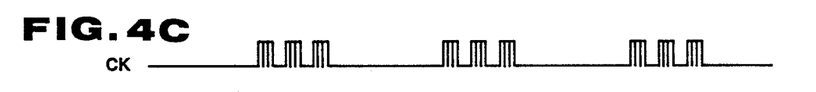

Transmission of the signals $S_S$ and $S_L$ between the CPU 6 in the exchangeable lens device 1 and the CPU 13 in the camera body 2 is preferably synchronized with the vertical synchronizing signals $S_V$ derived from the video signals in the video processing circuit 10. More particularly, as shown in FIG. 4B, chip select signals $C_S$ are provided by the CPU 13 in synchronization with the vertical synchronizing signals $S_V$ (FIG. 4A) and the position control signals $S_L$ and the sensed position signals $S_S$ are transmitted between the CPUs 6 and 13 only during the chip select signals $C_S$, as shown on FIG. 4D. Further, as shown on FIG. 4C, the reference clock signal $C_K$ is also transmitted in synchronism with the chip select signals $C_S$.

Figure 4D:
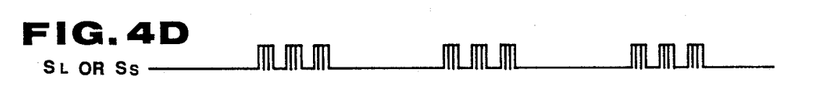

When the signals $S_L$ and $S_S$ are transmitted between the CPUs 6 and 13 only during the chip select signals $C_S$, the CPUs 6 and 13 only need to monitor whether the signals $S_L$ and $S_S$ are being transmitted during the periods of the chip select signals $C_S$. During the intervals between the chip select signals $C_S$, the CPUs 6 and 13 are free to effect control of the motors of the drive means 4 and to effect the arithmetic operations based on the previously transmitted signals. The foregoing simplifies the software that is required and reduces the labor involved in programming and/or debugging. Further, the signal processing speed is increased and the timing of the signal transmission is clearly defined so that signal transmission errors may be readily detected and more accurate signal transmission can be achieved.

Figure 5A:
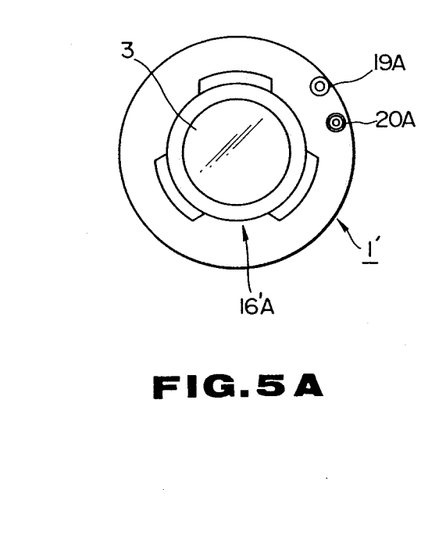
FIGS. 5A and 5B are elevational views similar to those of FIGS. 2A and 2B, respectively, but illustrating another embodiment of the invention.
Figure 5B:
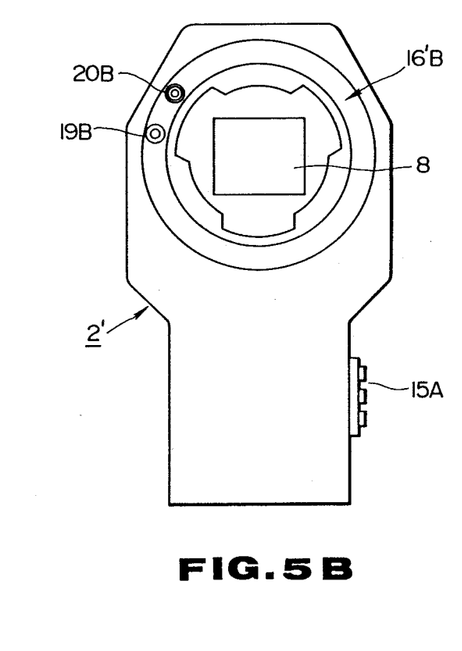

Referring now to FIGS. 5A and 5B, it will be seen that, in another embodiment of the present invention there illustrated, the electrical contacts 17A and 17B provided on the mating surfaces 16A and 16B of the exchangeable lens device 1 and the camera body 2 for transmitting the various signals between the CPUs 6 and 13 in the embodiment of FIGS. 1, 2A and 2B, are replaced by an optical transmission arrangement. More specifically, in the embodiment of FIGS. 5A and 5B, the mating surface 16'A of the exchangeable lens device 1' is provided with a light emitting element 19A and a light receiving element 20A, and the corresponding or mating surface 16'B of the camera body 2' is provided with a light emitting element 19B and a light receiving element 20B. The light emitting and receiving elements are positioned so that, when the surfaces 16'A and 16'B mate with each other upon the mounting of the exchangeable lens device 1' on the camera body 2', the light emitting element 19A will register with the light receiving element 20B for forming a so-called photo-coupler therewith, and the light emitting element 19B will similarly register with the light receiving element 20A for forming another photo-coupler therewith. It will be appreciated that the light emitting elements 19A and 19B emit light in a pulsed manner in accordance with the transmitted sensed position signal $S_S$ and position control signal $S_L$, respectively, and the light thus emitted is received by the light receiving elements 20B and 20A, respectively, for transmitting the signals $S_S$ and $S_L$ to the CPUs 13 and 6, respectively, in the camera body 2' and in the exchangeable lens device 1'. Optical signal transmission, as described with reference to FIGS. 5A and 5B, is effective to avoid signal transmission errors that may occur due to poor electrical contact or shorting when effecting electrical transmission, as by the electrical contacts 17A and 17B in the first described embodiment of this invention.

Figure 6A:
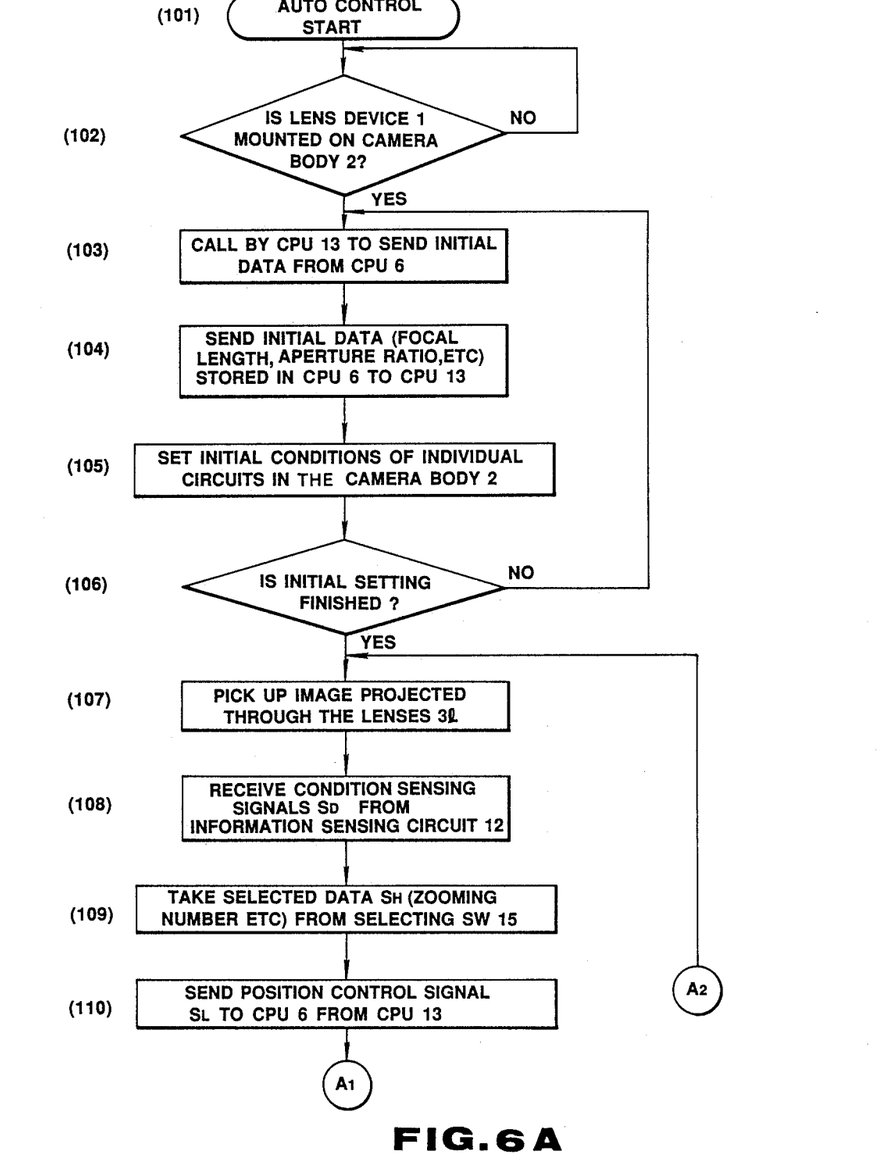
FIGS. 6A and 6B, taken together, illustrate a flow chart to which reference will be made in explaining the operation of the camera of FIG. 1.
Figure 6B:
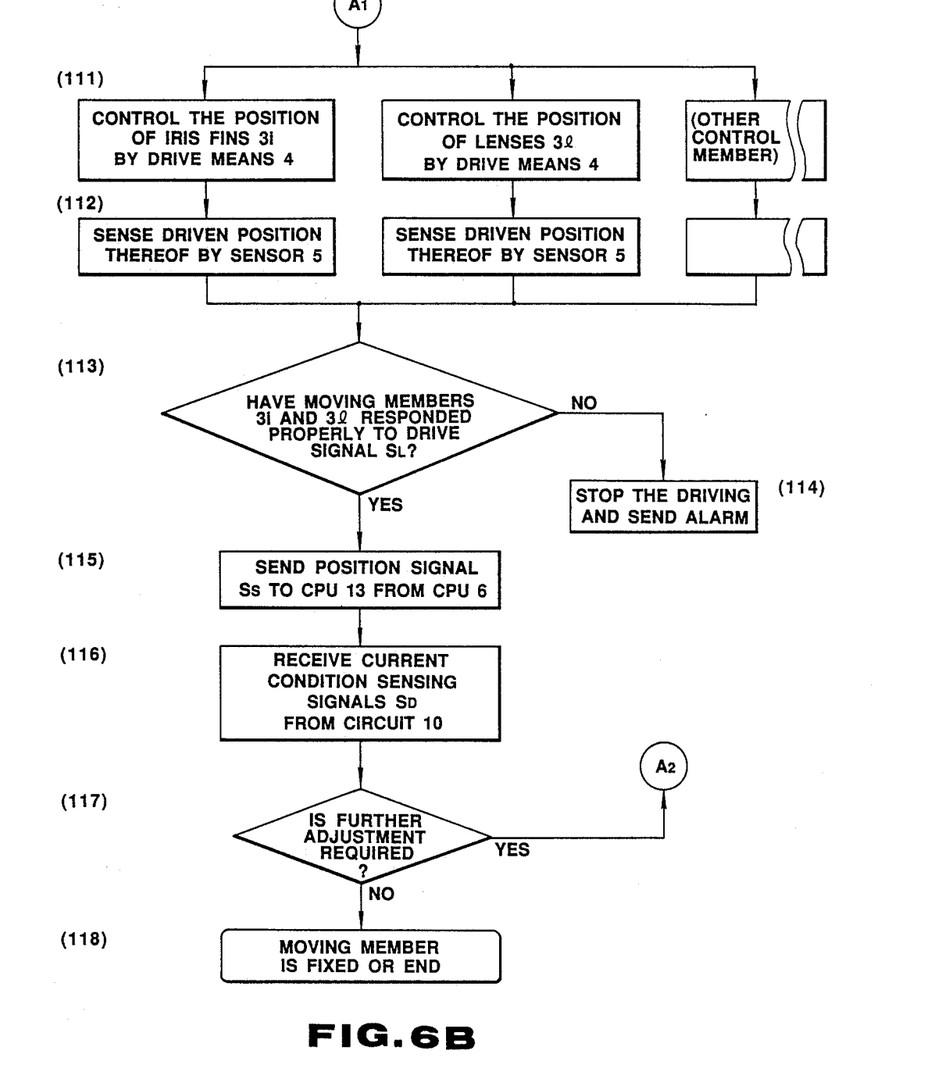

The operation of the video camera 100 in accordance with this invention will now be described with reference to the flow chart of FIGS. 6A and 6B. Upon the initiation of the automatic control of the camera 100 in the step (101), the program of the CPU 13 advances to the decision step (102) in which it is determined whether or not an exchangeable lens device 1 is mounted on the camera body 2. If a lens device 1 is mounted on the camera body 2, the program moves to the step (103) in which the CPU 13 issues a call for the transmission to it of the initial data from the CPU 6 in the exchangeable lens device 1 then mounted on the body 2. In response to such call, the CPU 6 is made operative in the next step (104) to transmit to the CPU 13 the initial data stored in the CPU 6, and which identifies the respective exchangeable lens device 1 and the characteristics thereof. It should be noted that, in the call by the CPU 13 to the CPU 6 constituting the step (103), predetermined addresses in the read data region of the page P0 are specified and, in response thereto, the respective first to fourth data $D_1$, $D_2$, $D_3$ and $D_4$ are transmitted from the CPU 6 of the exchangeable lens device 1 to the CPU 13 of the camera body 2. Therefore, in the step (104), information characteristic of the exchangeable lens device 1 acutally in use, such as, the focal length, aperture ratio, presence or absence of the automatic control unit 7, and the number of motors included in the drive means 4, is fetched into the CPU 13 of the camera body.

In response to the reception in the CPU 13 of the initial data from the CPU 16, the initial conditions of the various circuits in the camera body 2 are suitably set in the step (105) so as to accommodate such circuits to the characteristics of the exchangeable lens device 1 mounted on the camera body 2. In the following decision step (106), it is determined whether or not the initial setting of the circuits in the camera body 2 has been completed. If initial setting of the circuits is not completed, the program returns to the step (103) for calling upon the CPU 6 to either resend the initial data, or to send further initial data to the CPU 13. If the initial setting of the circuits in the camera body 2 is determined to be completed in the step (106), the program advances to the step (107) in which the image projected through the lenses 3l of the imaging lens assembly 3 is picked up by the imaging element 8 and the resulting video signal is supplied through the video processing circuit 10 to the optical information sensing circuit 12. In the next step (108), the optical information sensing circuit 12 senses the optical conditions of the projected image from the corresponding video signal, and the resulting condition sensing signals $S_D$ provided by the circuit 12 are received by the CPU 13. Thereupon, in the step (109) the CPU 13 takes from the manually actuable selector switches 15 the selected function adjustment signals $S_H$ which, for example, indicate a zooming number or the like desired by the operator of the camera.

In response to the condition sensing signals $S_D$ received from the circuit 12 and the selected function adjustment signals $S_H$ received from the selecting switches 15, the CPU 13 of the camera body 2 generates a corresponding position control signal $S_L$ which is transmitted to the CPU 6 in the step (110). Such position control signal $S_L$ specifies prescribed addresses of the write data region of page P1 for operating the one of the drive motors $M_1$-$M_4$ associated with the function to be adjusted. Thus, the CPU 6, in the step (111), suitably drives and controls a motor of the drive means 4, for example, for adjusting the positions of the iris fins of the adjustable diaphragm device 3i, or for adjusting the positions of the lenses 3l of the imaging lens assembly 3.

During the operation of one or more of the motors of the drive means 4 under the control of the CPU 6 in response to the position control signal $S_L$, the sensors 5 continuously detect the changing positions of the respective movable elements of the imaging lens assembly 3 and corresponding sensed position signals $S_S$ are returned by the CPU 6 to the CPU 13. In the event that the movable elements of the imaging lens assembly 3 to be driven by the drive means 4 for adjusting a respective function do not, in fact, move in accordance with the position control signal $S_L$ transmitted to the CPU 6 in the step (110) for example, if the drive means 4 or the mechanism for manually adjusting a function of the imaging lens assembly 3 is jammed, this fact is determined in the step (113). More specifically, if it is determined in the step (113) that the movable lens elements 3l or the movable iris fins of the adjustable diaphragm 3i have not moved properly in response to the position control signal $S_L$, the CPU 13 transmits a suitable signal $S_L$ to the CPU 6 for halting the operation of the drive means 4 and further actuates a suitable alarm in the step (114). Therefore, excess mechanical stressing and possible damage to the drive means 4 or other structures are avoided if the drive means 4 or the movable elements of the imaging lens assembly 3 are, for any reason, jammed or otherwise rendered immovable.

On the other hand, if the movements of the movable lens elements 3l and of the iris fins of the diaphragm 3i of the imaging lens assembly 3 proceed properly in response to the position control signal $S_L$, the program advances from the step (113) to the step (115) in which sensed position signals $S_S$ are transmitted from the CPU 6 to the CPU 13 which, in the step (116), is also receiving current condition sensing signals $S_D$ from the optical information sensing circuit 12. In response to the foregoing, the CPU 13 determines, in the step (117), whether, on the basis of the most recently received sensed position signals $S_S$ from the CPU 6, the current condition sensing signals $S_D$ from the circuit 12 and the selected functional adjustment signals $S_H$ previously input from the selector switches 15, any further adjustment of the imaging lens assembly 3 is required. If no further adjustment is required, that is, if the condition of the image projected on the imaging element 8 precisely corresponds to the positioning of the adjustable elements of the imaging lens assembly 3 called for by the position control signals $S_L$, the program advances to its terminal step (118) at which the movable element or elements of the assembly 3 are fixed. However, if it is determined by the CPU 13 in the step (117) that further adjustment is required, the program is returned to the step 107 and the subsequent steps are repeated until finally, no further adjustment is required. Thus, by the transmission of the signals $S_L$ and $S_S$ between the CPUs 6 and 13, adjustments of the various functions of the imaging lens assembly 3, such as, focusing, exposure and zooming adjustments are effected.

It will be seen that, in the camera according to the present invention, the provision of microprocessors or CPUs 6 and 13 in both the exchangeable lens device 1 and the camera body 2 makes it possible to transmit between the camera body 2 and the removable lens device 1 signals $S_L$ and $S_S$ that merely indicate the extent of the desired adjustment of the function of the imaging lens assembly and the position thereof. Such signals are to be contrasted with signals for directly driving and controlling the drive motors included in the exchangeable lens device. Further, by including the CPU 6 in the exchangeable lens device 1 for actually controlling the motors of the drive means 4 therein, it is possible to effect the optimum drive control suited to the characteristics of the drive means 4 or the weight of the imaging lens assembly 3 in the respective exchangeable lens device 1 which may vary substantially from other exchangeable lens devices intended for use with the camera body 2.

Although preferred embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An exchangeable lens device comprising:
a housing adapted for removable mounting on a camera body;
imaging lens means contained within said housing and having elements which are controllable for adjusting respective functions thereof;
drive means for each of said functions also contained within said housing and being operative to drive the respective controllable elements;
sensing means contained within said housing for sensing positions of said controllable elements established by the respective drive means and providing corresponding position information; and
signal processing means contained within said housing and operative to control said drive means in response to position control signals applied from outside of said housing, and to provide sensed position signals to the outside of the housing in response to said position information.

2. An exchangeable lens device according to claim 1; further comprising optical transmission means for receiving said position control signals from outside of said housing and for emitting said sensed position signals from said housing.

3. An exchangeable lens device according to claim 1; in which said elements of the imaging lens means include an assembly of lens elements movable axially relative to each other for changing the focal length and focal position of said assembly as said functions to be adjusted.

4. An exchangeable lens device according to claim 3; in which said elements of the imaging lens means further include adjustable diaphragm members for effecting exposure adjustment as one of said functions to be adjusted.

5. A camera comprising:
an exchangeable lens device including imaging lens means having elements which are controllable for adjusting respective functions thereof, drive means for each of said functions and being operative to drive the respective controllable elements, sensing means for sensing positions of said controllable elements established by the respective drive means and providing corresponding position information, and first signal processing means operative to control said drive means in response to externally applied position control signals and to provide sensed position signals to the outside of the exchangeable lens device in response to said position information; and
a main body on which said exchangeable lens device is removably mounted including second signal processing means operative to receive said sensed position signals provided by said first signal processing means and to provide said externally applied position control signals to said first signal processing means.

6. A camera according to claim 5; in which said exchangeable lens device and said main body have optical transmission means which cooperate for transmitting said sensed position signals and said position control signals therebetween when said exchangeable lens device is mounted on said main body.

7. A camera according to claim 5; in which said main body further includes a source of vertical synchronizing signals, and said first and second signal processing means effect transmission of said position control signals and said sensed position signals therebetween in synchronism with said vertical synchronizing signals.

8. A camera according to claim 7; in which said transmission of the position control signals and the sensed position signals is effected intermittently, and said drive means are operated to drive said respective controllable elements of said exchangeable lens device only during intervals between successive intermittent transmissions of said position control and sensed position signals.

9. A camera according to claim 5; in which said main body further includes imaging means for providing a video signal corresponding to an image projected onto said imaging means by said imaging lens means, means responsive to said video signal for providing to said second signal processing means condition sensing signals characteristic of respective conditions of said image projected on said imaging means, and manually actuable selector means for providing selected function adjustment signals to said second signal processing means, said second signal processing means determining said position control signals applied externally to said first signal processing means on the basis of said selected function adjustment signals and said condition sensing signals in addition to said sensed position signals.

10. A camera according to claim 9; in which said first signal processing means stores information identifying the respective exchangeable lens device and characteristics of the latter, and said sensed position signals provided from said first signal processing means to said second signal processing means contain said information identifying the respective exchangeable lens device and said characteristics thereof.

11. A camera according to claim 9; in which said controllable elements of the imaging lens means include an assembly of relatively axially movable lens elements for changing the focal length and focal position of said assembly as said functions to be adjusted, and said condition sensing signals are characteristic of the focused condition of said image projected onto said imaging means.

12. A camera according to claim 9; in which said controllable elements of said imaging lens means include adjustable diaphragm members for effecting exposure adjustment as said function to be adjusted, and said condition sensing signals are characteristic of the amount of light included in said image projected onto said imaging means.

13. A camera according to claim 5; in which said exchangeable lens device further includes automatic control means connected with said first signal processing means and through which said drive means are controlled by said automatic control means for adjusting said respective functions of the imaging lens means.

14. A camera comprising:
a main body including an imaging element operative to provide a video signal corresponding to an image projected onto said element, means responsive to said video signal for providing condition sensing signals corresponding to respective conditions of said image projected on said imaging element, manually actuable selector means for providing selected function adjustment signals, and main body signal processing means receiving said condition sensing signal and said selected function adjustment signals; and
exchangeable lens devices interchangeably mountable on said main body and each including imaging lens means for projecting said image onto said imaging element and having elements which are controllable for adjusting respective functions of said imaging lens means, drive means for each of said adjustable functions and being operative to drive the respective controllable elements, sensing means for sensing positions of said controllable elements established by the respective drive means and providing corresponding position information, and auxiliary signal processing means storing information identifying the respective exchangeable lens device and characteristics of the latter and being operative to provide to said main body signal processing means sensed position signals corresponding to said position information and the stored identifying information;
said main body signal processing means being responsive to said condition sensing signals, said selected function adjustment signals and said sensed position signals to provide position control signals to said auxiliary signal processing means for causing the latter to correspondingly control said drive means.

15. A camera according to claim 14; in which each of exchangeable lens devices and said main body have optical transmission means which cooperate for transmitting said sensed position signals and said position control signals therebetween when said exchangeable lens device is mounted on said main body.

16. A camera according to claim 14; in which said main body further includes a source of vertical synchronizing signals, and said main body and auxiliary signal processing means effect transmission of said position control signals and said sensed position signals therebetween in synchronism with said vertical synchronizing signals.

17. A camera according to claim 16; in which said transmission of the position control signals and the sensed position signals is effected intermittently, and said drive means are operated to drive said respective controllable elements of said exchangeable lens device only during intervals between successive intermittent transmission of said position control and sensed position signals.

18. A camera according to claim 14; in which each said exchangeable lens device further includes automatic control means connected with said auxiliary signal processing means and through which said drive means are controlled by said automatic control means for adjusting said respective functions of the imaging lens means.

* * * * *